May 27, 1930.  D. D. WARNER  1,760,729
BOX SHAPED CAGE RAT TRAP
Filed Jan. 9, 1928
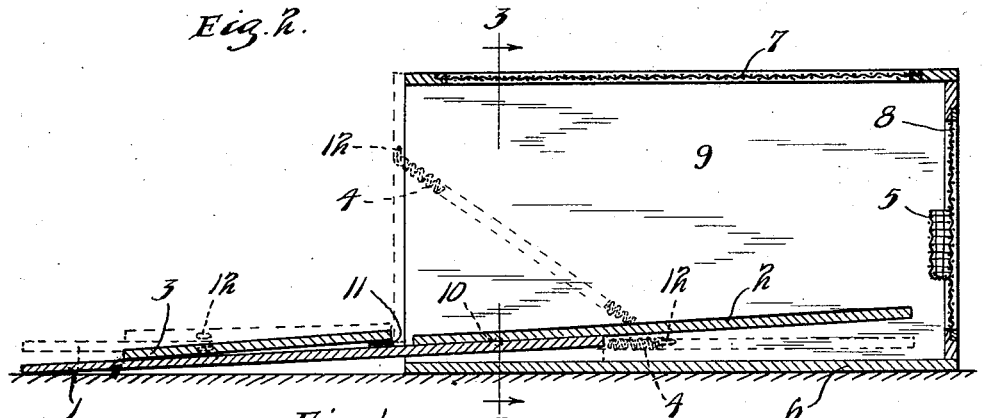
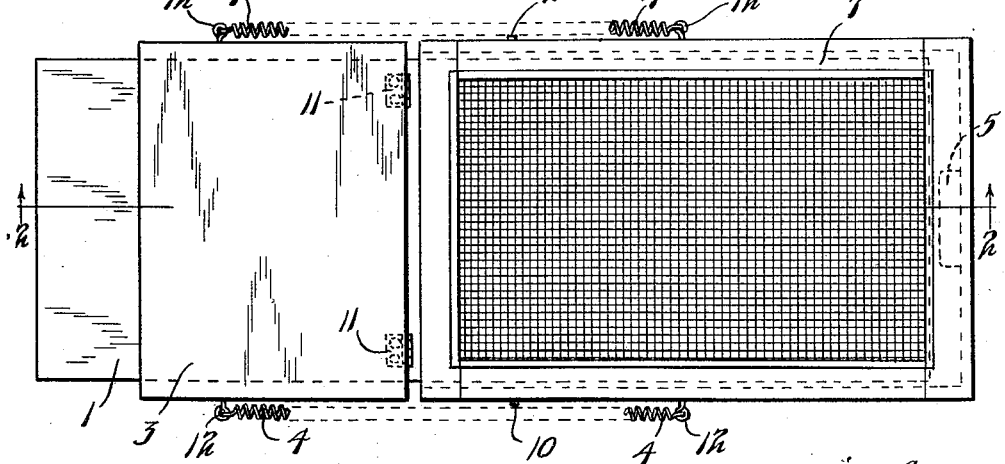
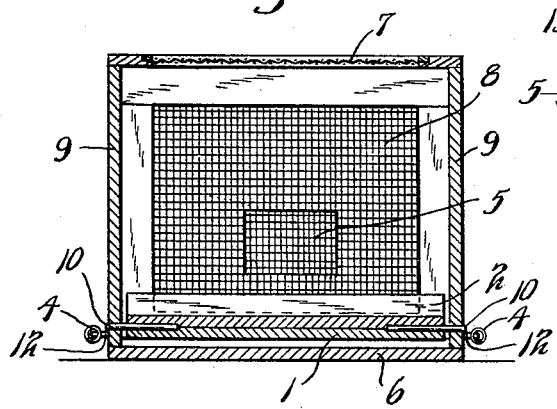
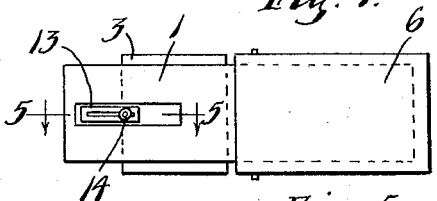
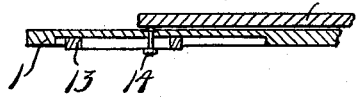
INVENTOR.
DAN D. WARNER.
BY HIS ATTORNEYS.

Patented May 27, 1930

1,760,729

UNITED STATES PATENT OFFICE

DAN D. WARNER, OF JAMESTOWN, NORTH DAKOTA

BOX-SHAPED CAGE RAT TRAP

Application filed January 9, 1928. Serial No. 245,497.

This invention relates to a trap and particularly to a trap having a casing in which the animal is trapped after entering the casing through one end thereof. While the trap may be made of various sizes to suit various animals, it has been very successfully used as a mouse and rat trap.

It is an object of this invention to provide a trap comprising a casing having an open end and a platform pivoted to said casing extending thereinto above the floor thereof and some distance in front of said opening, said platform carrying and adapted to operate a closing means for said casing.

It is a further object of this invention to provide a trap comprising a casing preferably made of open-work material, such as a metal screen having an open end adapted to be closed by a door, which door is carried on a pivoted platform extending into the casing above the front thereof and some distance in front of the casing.

It is more specifically an object of the invention to provide a trap comprising a casing having an open end, a platform pivoted to the sides of the casing adjacent said open end and extending thereinto above the floor thereof, said platform having a door hinged thereto, resilient means such as a coiled spring being secured to each of the sides of the casing and to said door whereby said door may be opened with said springs under tension and the front end of the platform depressed so that said resilient means extends below the axis of the platform pivot, the inner end of the platform being raised so that when an animal treads thereon said resilient means will be raised above said axis and the door will snap shut.

These and other objects and advantages of the invention will be fully set forth in the following description made in connection with the accompanying drawings, in which like reference characters refer to similar parts throughout the several views, and in which:—

Fig. 1 is a plan view of the trap in open or set position;

Fig. 2 is a vertical section taken on line 2—2 of Fig. 1, some parts being shown in different positions in dotted lines;

Fig. 3 is a vertical section taken on line 3—3 of Fig. 2;

Fig. 4 is a bottom plan view showing a modification on a reduced scale, and

Fig. 5 is a vertical section taken on line 5—5 of Fig. 4, all sectional views being taken as indicated by the arrows.

Referring to the drawings, a trap is shown comprising a casing having a bottom or floor 6. While this casing may be made in various shapes, in the embodiment of the invention illustrated it is shown as rectangular in form. The casing is shown as having solid sides 9 rising from the floor 6 and as having a reticulate end 8 and top 7. Said end 8 and top 7 may be made of iron screen and in practice screen having substantially a one-fourth inch mesh has been used. The end 8 is provided with a small receptacle or pocket 5 at its inner side forming a bait holding means, which pocket is also shown as substantially rectangular in shape. The casing is open at the end opposite end 8 and has extending thereinto one end 2 of a platform 1 having a transverse opening therethrough receiving the rod or pintle 10 journaled in the sides 9 of the casing. As shown in Figs. 1 and 2 this pintle 10 is located adjacent the bottom of sides 9 and adjacent the open end of the casing. As clearly shown in Fig. 1, the inner end 2 of the platform over-lies or over-laps the outer end at the inner portion of the latter and the outer end of portion 2 thus forms a small ledge or shoulder extending from the top surface of the outer end of the platform 1. A door 3 is hinged by the hinges 11 to the top of platform 1 just outward of said shoulder or the outer end of the portion 2. Door 3 is adapted to be swung down substantially flat against the platform 1, or to be disposed in vertical position as indicated in Fig. 1 so that when in said vertical position it abuts the end of the casing 7 and said shoulder and tightly closes the end of said casing. Resilient means, such as extensible coiled springs 4 are secured at their inner ends to members 12, such as nails or screws, which are secured in the sides 9. At their outer ends the springs 4 are secured to similar members 12 secured in the sides of the door 3.

With the described structure it will be seen that platform 1 is pivoted for a tilting motion about the pintle 10 and that door 3 can be swung downward against the tension of springs 4. To set the trap, door 3 will be swung down as indicated in Fig. 1 to its outer side, in contact with the top of platform 1. Platform 1 is then turned downwardly until its outer end contacts the supporting surface for the trap. The inner end of platform 1, that is the end 2 thereof, will then be slightly raised above floor 6. The springs 4 are arranged so that when the parts are thus positioned they will extend just below the axis of pintle 10. The trap will thus remain in a position with door 3 swung downwardly and the outer end of platform 1 depressed. Bait will be placed in the bait holding pocket 5. The animal will approach the trap and see or smell the bait in pocket 5. The trap being of reticulate material at the top and rear end makes the same quite light in day time and this assists in having the animal enter. The animal passes over the outer end of platform 1 into the trap and when it treads on the inner end 2 of the platform, said end will be depressed to the position shown in dotted lines in Fig. 1, the platform being very nicely balanced. When the inner end 2 of the platform is depressed the position of springs 4 is changed so that said springs are brought above the axis of pintle 10 and the springs then swing the door 3 upward very quickly and snap it shut so that it is in its closed position in front of the casing. The animal is thus trapped in the casing. It will of course be apparent that the animal cannot trip the trap until it passes into the casing.

In Figs. 4 and 5 a modification is shown in which a platform 1 is shown as having a shallow slot formed therein and a metal slide 13 inserted therein having a central slot through which passes a screw 14 screwed to platform 1. The slide 13 can thus be adjusted lengthwise of platform 1 so that the desired balance can be obtained for said platform.

From the above description it is seen that applicant has provided a very simple and very efficient trap. The parts of the trap are very few and the same can be easily and inexpensively made and at the same time very ruggedly made. The trap has proven very successful in practice and is being commercially marketed.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A trap comprising a casing having an open end, a platform pivoted to said casing, extending into the same through said end and extending some distance outward from said end, a door carried by said platform adapted to close said casing and resilient means connected to said casing and door constructed and arranged to be positioned below the axis of said platform pivot when said door is in open position and the outer end of said platform depressed and to be raised above said pivot when the inner end of said platform is depressed whereby when said inner end is depressed, said resilient means will quickly close said door.

2. A trap having in combination, a casing having a bottom and sides and an open end, a platform extending into said open end above said bottom and some distance outward of said end, a pivot for said platform in said sides adjacent the bottom thereof and said open end, a door hinged to said platform and adapted to close said end of the casing, resilient means connected to the sides of the casing and to the sides of said door positioned so that when said door is swung down on said platform and the outer end of said platform depressed, said means will extend below the axis of said pivot, but when the inner end of said platform is depressed, said means will extend above the axis of said pivot whereby said door will be quickly closed by said means.

3. A trap having in combination, a rectangular casing having a bottom, sides and open-work rear end and top and being open at its front end, a platform extending to said casing adapted to swing about said pivot in the sides of said casing adjacent the bottom of said sides and said open end, said platform having a downwardly extending off-set portion adjacent said open end, tensile coiled springs secured to the sides of said casing at one end and to the sides of said door at their other ends so positioned that when said door is swung downwardly on said platform and the outer end of said platform is depressed, said spring will extend below the axis of said pivot, but when the inner end of said platform is depressed said springs will extend above the axis of said pivot and quickly close said door, and bait holding means at the rear end of said casing.

4. A trap having in combination, a casing having an open end, a platform pivoted to said casing extending into the same through said open end and outwardly some distance from said end, a member carried by said platform and adapted to be moved into position to close said open end and resilient means connected to said casing and said member adapted to be placed under tension when said member is in open position and the outer end of said platform depressed, and to move said member to closed position when the inner end of said platform is depressed.

DAN D. WARNER.